United States Patent
Perciful

[19]
[11] Patent Number: 5,887,920
[45] Date of Patent: Mar. 30, 1999

[54] IMPACT SHOVEL

[76] Inventor: Terry D. Perciful, P.O. Box 2169-155, Branson West, Mo. 65737

[21] Appl. No.: 969,818

[22] Filed: Nov. 13, 1997

[51] Int. Cl.$^6$ ..................................................... A01B 1/02
[52] U.S. Cl. ............................................. 294/57; 294/60
[58] Field of Search .............................. 294/49, 50, 50.5, 294/57–60; 254/131, 131.5

[56] References Cited

U.S. PATENT DOCUMENTS

| | | |
|---|---|---|
| 357,408 | 2/1887 | Pittenger . |
| 554,139 | 2/1896 | Ober . |
| 682,623 | 9/1901 | Hughes et al. . |
| 821,847 | 5/1906 | Arnavat ....................................... 294/60 |
| 1,351,425 | 8/1920 | Kaney . |
| 2,840,414 | 6/1958 | Beau ........................................... 294/51 |
| 3,981,043 | 9/1976 | Curry ......................................... 294/57 |
| 3,993,340 | 11/1976 | Rusing et al. ........................... 294/53.5 |
| 4,466,188 | 8/1984 | Svendsgaard .............................. 294/49 |
| 4,475,757 | 10/1984 | Glock ........................................ 294/51 |
| 4,730,860 | 3/1988 | Padgett ...................................... 294/49 |
| 4,904,011 | 2/1990 | Hawk ......................................... 294/49 |
| 5,109,930 | 5/1992 | Napier ....................................... 172/13 |
| 5,209,534 | 5/1993 | Crenshaw et al. ......................... 294/49 |
| 5,645,305 | 7/1997 | Lispi ......................................... 294/60 |

FOREIGN PATENT DOCUMENTS

| | | | |
|---|---|---|---|
| 2421-036 | 11/1979 | France ...................................... 294/57 |
| 2580-138 | 10/1986 | France ...................................... 294/49 |
| 3-233025 | 10/1991 | Japan ....................................... 294/49 |
| 2069914 | 9/1984 | United Kingdom ..................... 294/57 |

*Primary Examiner*—Dean Kramer
*Attorney, Agent, or Firm*—William R. Sharp

[57] ABSTRACT

A shovel of the type comprising a blade and a shank having at least one longitudinal axis, the improvement comprising: at least one sleeve coaxially and slidably received upon the shank; a first member integrally connected to the shank between the blade and the sleeve(s); a second member integrally connected to the sleeve(s) and being longitudinally and manually movable with the sleeve(s) in a direction away from or toward the first member so that the second member can be moved to a position longitudinally separated from the first member and then moved toward the first member so as to impact the first member and impart a force to the blade.

9 Claims, 1 Drawing Sheet

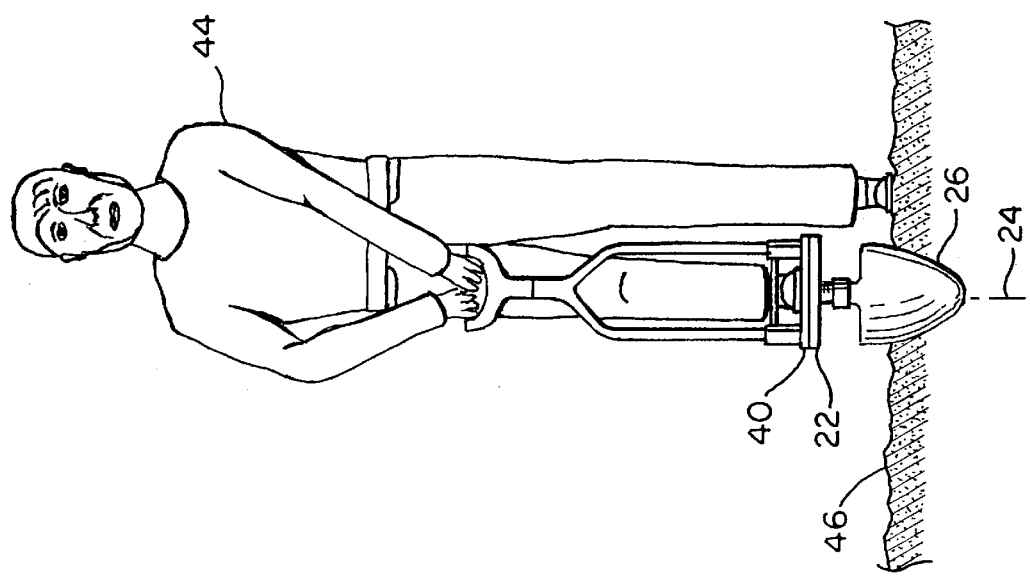
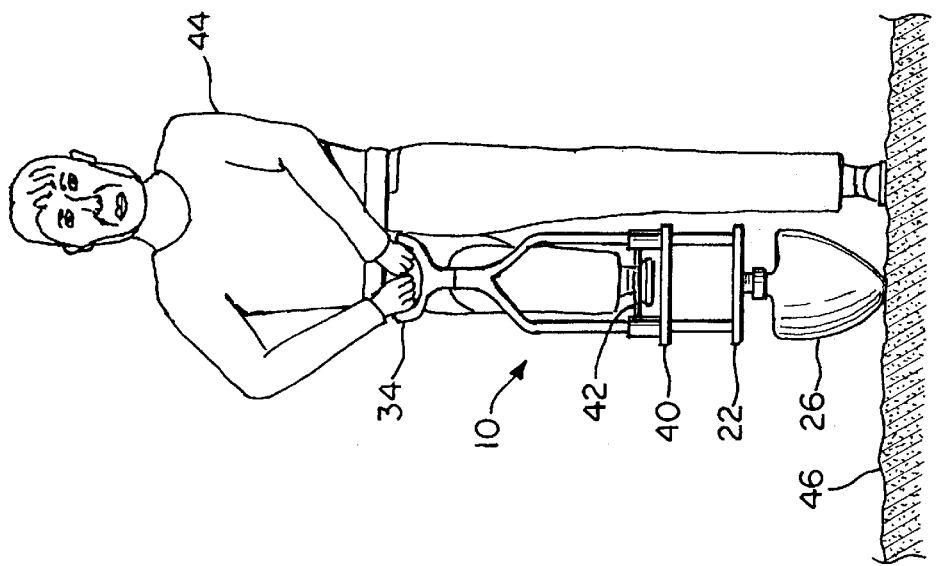
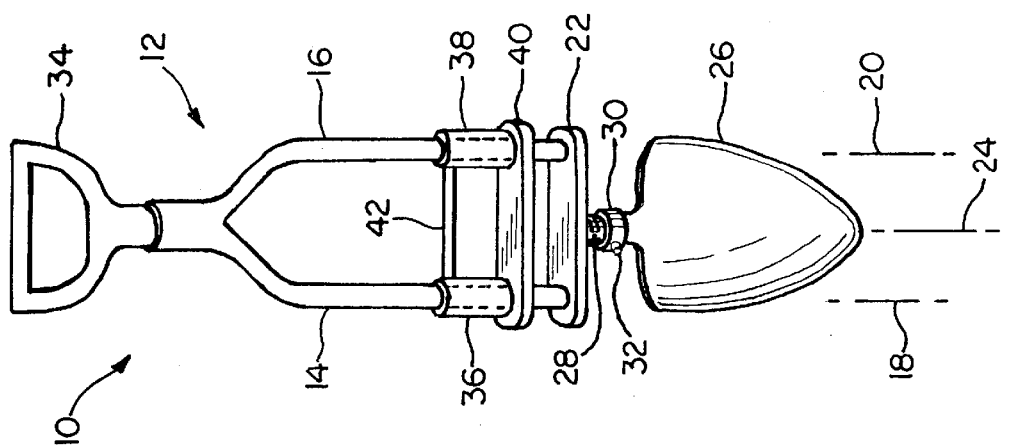

IMPACT SHOVEL

BACKGROUND OF THE INVENTION

The invention relates to a shovel and more particularly to an improved "impact" shovel which is more effective in digging and scraping chores.

The conventional shovel, comprising at least a blade and a shank, is very ineffective at penetrating hard ground, ice, clay, rocks, etc. To maximize performance of the shovel, the user will typically stomp or kick the edge of the blade. The blade edge was really not designed for this. Moreover, the user's foot engages the blade edge on one side of the shank. The resulting force on the blade is not in alignment with the longitudinal axis of the blade, but is somewhat sideways, thereby resulting in ineffective penetration by the blade.

SUMMARY OF THE INVENTION

It is, therefore, an object of the invention to provide an improved shovel for effectively penetrating hard ground, ice, clay, rocks, etc. with a minimum of effort.

This object is realized by a shovel of the type comprising a blade and a shank having at least one longitudinal axis, the improvement comprising: at least one sleeve coaxially and slidably received upon the shank; a first member integrally connected to the shank between the blade and the sleeve(s); a second member integrally connected to the sleeve(s) and being longitudinally and manually movable with the sleeve (s) in a direction away from or toward the first member so that the second member can be moved to a position longitudinally separated from the first member and then moved toward the first member so as to impact the first member and impart a force to the blade.

According to a preferred embodiment, the first and second members are plates substantially centered with respect to the longitudinal axis of the blade and the shank is bifurcated to receive two sleeves. Impact of the second member with the first member can be actuated with one foot of a user with the aid of a return bar. Upon impact, the force imparted to the blade is desirably aligned with the blade axis.

BRIEF DESCRIPTION OF THE DRAWINGS

FIG. 1 is a perspective view of a preferred embodiment of the invention.

FIGS. 2 and 3 illustrate the embodiment of FIG. 1 in use.

DETAILED DESCRIPTION OF THE INVENTION

A preferred embodiment of the invention will now be described with reference to the FIGURES.

The term "integrally connected" as used in the description hereafter most preferably refers to a welded connection, but such term is not limited to this particular type of connection. Members integrally connected to one another could be formed as single integral piece.

Referring to FIG. 1, the illustrated "impact" shovel 10 includes a shank 12 which is preferably bifurcated so as to comprise a shank portion 14 and a shank portion 16. Shank portion 14 has a longitudinal axis 18 and shank portion 16 has a longitudinal axis 20. Respective ends of shank portions 14 and 16 are integrally connected to a plate 22 which is substantially centered with respect to longitudinal axis 24 of blade 26.

Blade 26 is fixedly but removably connected to plate 22 by means of a male, externally threaded member 28 integrally connected to plate 22 and threadedly receiving thereon a female, internally threaded member 30 integrally connected to the head of blade 26. A blade locking pin is shown at 32. After removal of locking pin 32, blade 26 can be unscrewed from male member 28 and replaced with another type of blade if desired. This feature of interchangeable blades is a convenient feature for the user which alleviates the need for having a number of different shovels, thereby saving money and conserving storage space.

The end of shank 12 opposite the ends of shank portions 14 and 16 is preferably fixedly connected to a handle 34. Handle 34 can be gripped when using impact shovel 10.

As shown, shovel axis 24 lies between and is substantially parallel to shank axes 18 and 20. The radial distance between shank axis 18 and shovel axis 24 is preferably substantially equivalent to the radial distance between shank axis 20 and shovel axis 24.

A sleeve 36 is coaxially and slidably received upon shank portion 14, and a sleeve 38 is coaxially and slidably received upon shank portion 16. The relative positions of sleeves 36 and 38, plate 22, and blade 26 is such that plate 22 is between the sleeves and blade 26. A plate 40 is integrally connected to ends of sleeves 36 and 38 so as to be substantially centered with respect to shovel axis 24. Plate 40 has holes (not visible in FIG. 1), aligned with sleeves 36 and 38, through which shank portions 14 and 16 are received. A return bar 42 is integrally connected to and extends between sleeves 36 and 38 so as to be longitudinally spaced from plate 40. Plate 40 is longitudinally movable with sleeves 36 and 38 in a direction away from or toward plate 22. Plate 40 is shown in FIG. 1 as being separated from plate 22 to more clearly show the structural connections of shank portions 14 and 16 to plate 22.

With respect to materials of construction, different parts of impact shovel 10 are preferably comprised of the following: shank 12 as well as sleeves 36 and 38—steel tubing; plates 22 and 40—plate steel; return bar 42—steel; blade 26—tempered steel; and handle 34—a sturdy and hard plastic.

Referring to FIG. 2, there is shown a user 44 of impact shovel 10 preparing to penetrate ground 46 with blade 26. With his left foot on the surface of ground 46 while gripping handle 34, user 44 is shown with his right foot between return bar 42 and plate 40. The top of the shoe on the right foot engages return bar 42 while raising the right foot to thereby raise plate 40 in a direction away from plate 22, resulting in the illustrated position of plate 40 longitudinally separated from plate 22.

User 44 now engages plate 40 with the sole of his shoe, and pushes down to move plate 40 toward plate 22 so as to impact plate 22. Plates 22 and 40 are shown in FIG. 3 after impact, resulting in a downward force imparted to blade 26 in a direction aligned with shovel axis 24. Successful penetration of blade 26 into ground 46 is achieved. Such penetration is possible even when ground 46 is very dry and hard, contains rocks, is frozen, or has a high clay content.

Obviously, many modifications and variations of the present invention are possible in light of the above teachings. For example, under broad aspects of the invention, the shank could comprise a single tube and have a single sleeve. Another variation under broad aspects of the invention is a modified design in which the plates would be closer to the handle and be adapted for impact by hand. It is, therefore, to be understood that within the scope of the appended claims, the invention may be practiced otherwise than as specifically described.

That which is claimed is:

1. A shovel of the type comprising a blade and a shank having at least one longitudinal axis, the improvement comprising:
   at least one sleeve coaxially and slidably received upon the shank;
   a first member integrally connected to the shank between the blade and said at least one sleeve so as to be external to said at least one sleeve;
   a second member integrally connected to said at least one sleeve and being longitudinally and manually movable with said at least one sleeve in a direction away from or toward the first member so that the second member can be moved to a position longitudinally separated from the first member and then moved toward the first member so as to impact the first member and impart a force to the blade.

2. A shovel of the type comprising a blade and a shank having at least one longitudinal axis, the improvement comprising:
   at least one sleeve coaxially and slidably received upon the shank;
   a first member, comprising a plate, integrally connected to the shank between the blade and said at least one sleeve;
   a second member, comprising a plate, integrally connected to said at least one sleeve and being longitudinally and manually movable with said at least one sleeve in a direction away from or toward the first member so that the second member can be moved to a position longitudinally separated from the first member and then moved toward the first member so as to impact the first member and impart a force to the blade.

3. A shovel as recited in claim 2, wherein the blade has a longitudinal axis substantially parallel to said at least one longitudinal axis of the shank, and wherein the first and second members are substantially centered with respect to the shovel axis.

4. A shovel as recited in claim 3 wherein the shank is bifurcated so as to comprise a first shank portion and a second shank portion, and wherein said at least one sleeve comprises a first sleeve slidably received on the first shank portion and a second sleeve slidably received on the second shank portion.

5. A shovel as recited in claim 4 wherein said at least one longitudinal axis of the shank comprises a first shank axis of the first shank portion and a second shank axis of the second shank portion, and wherein the shovel axis lies between the first shank axis and the second shank axis.

6. A shovel as recited in claim 5 wherein the radial distance between the first shank axis and the shovel axis is substantially equivalent to the radial distance between the second shank axis and the shovel axis.

7. A shovel as recited in claim 6 wherein the shovel further comprises a return bar integrally connected to and extending between the first and second sleeves, whereby a user of the shovel may engage the return bar with one foot and move the second member to a position longitudinally separated from the first member and then engage the second member with the foot to move the second member toward the first member so as to impact the first member.

8. A shovel as recited in claim 7 wherein the shovel also has a handle, and wherein the shank has a first end fixedly connected to the handle and the first and second shank portions have respective second and third ends integrally connected to the first member.

9. A shovel as recited in claim 8 wherein the blade is fixedly but removably mounted to the first member.

* * * * *